Nov. 9, 1926.
W. A. McINTYRE
RAT AND MOUSE TRAP
Filed Dec. 30, 1925
1,606,650
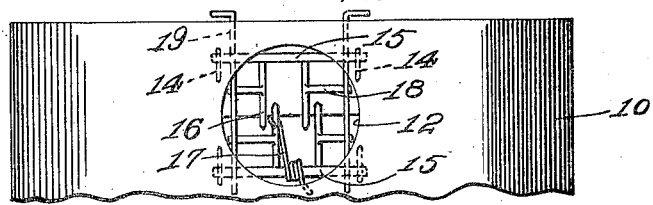
Fig. 1.
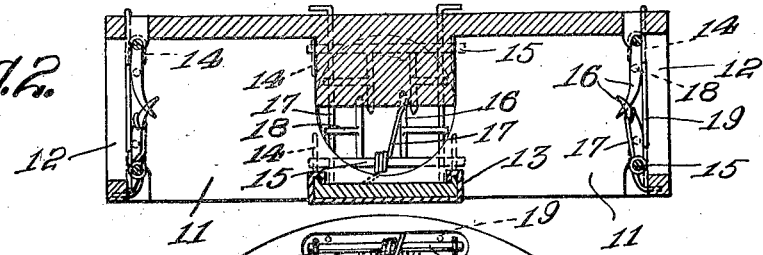
Fig. 2.
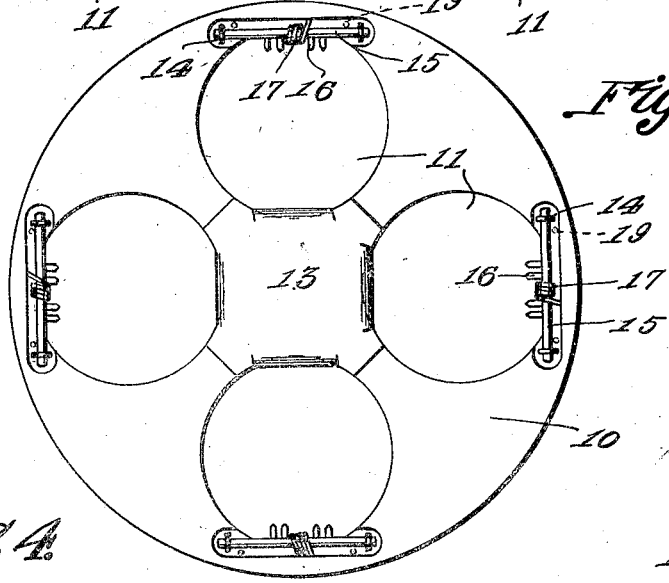
Fig. 3.
Fig. 4.
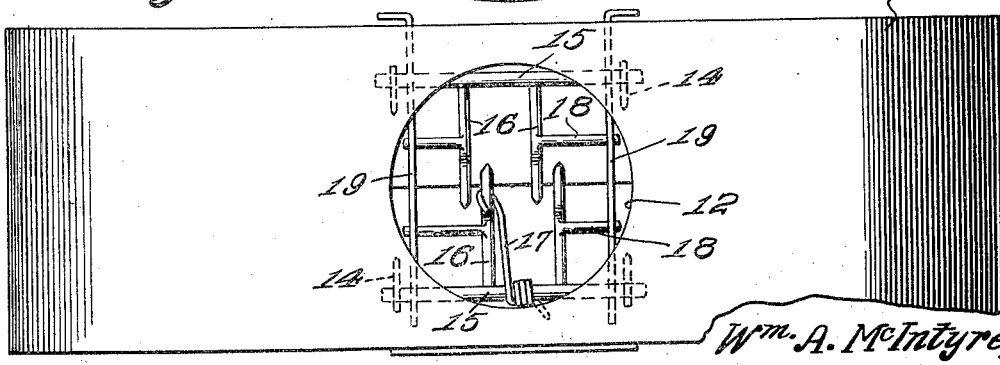
Wm. A. McIntyre,
INVENTOR
BY Victor J. Evans
ATTORNEY
WITNESS:

Patented Nov. 9, 1926.

1,606,650

UNITED STATES PATENT OFFICE.

WILLIAM A. McINTYRE, OF BEAVERCREEK, OREGON.

RAT AND MOUSE TRAP.

Application filed December 30, 1925. Serial No. 78,438.

This invention relates to animal catching devices, or vermin destroyers, and has for its object the provision of a novel trap designed particularly for use in catching rats or mice, a distinct feature of importance being that the device is always set ready for use and therefore does not necessitate any attention whatsoever, other than taking out the rats or mice caught.

An important object of the invention is to provide a trap which, when once baited, need not be rebaited for a considerable length of time in view of the fact that it is impossible for the animals to gain access to the bait and consume it.

An additional object is to provide a trap of this character which will be simple and inexpensive in manufacture, easy to use, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a side elevation of the device.

Figure 2 is a vertical cross section.

Figure 3 is a bottom plan view, and

Figure 4 is a side elevation on a larger scale than Figure 1, to illustrate the mounting of the gates or jaw members.

Referring more particularly to the drawings, I have shown the device as comprising a block-like body 10 of suitable size, shape and material, though preferably of cylindrical form and constructed of wood. The top of this body is closed while the bottom portion is formed with recesses 11, the sides being provided with a plurality of holes 12 located at any desired distances apart in communication with the recesses 11 and through which the animals will attempt to enter to gain access to the bait which is mounted within a suitable holder or cup-like device 13 secured at the bottom of the body. Obviously, the bait used will give off its aroma in the usual manner and attract animals to the trap so that they will try to enter through the openings 12 to get at the bait.

Suitably pivotally mounted above and below each of the openings 12 and held as for instance by staples 14 or the like, are rock shafts or rods 15 carrying prongs, claws or teeth 16 which extend partway across the openings 12 toward each other. It will be observed that there is a pair of upper prong members and a pair of lower ones for each opening 12 and connected with the lower ones are springs 17 which normally urge the prongs or claws outwardly with respect to the body. The prongs are formed with lateral lugs or arms 18 engaged by removable pins 19 slidably mounted vertically through the body and acting to prevent outward swinging of the prongs.

In the operation, it will be seen that whenever a mouse or rat is attracted by the bait in the trap and attempts to enter through one of the openings 12 he will of course push against the prongs 16 which are capable of yielding inwardly or toward the center of the body. However, when the animal attempts to back out these prongs will swing toward the outside of the casing and will catch the animal behind the neck or at the neck, and consequently hold it firmly so that it cannot escape. To remove a captured animal the pins 19 must be withdrawn so that the prongs may swing outwardly. Obviously, the device may be used repeatedly and as long as any one of the holes 12 is unoccupied by a captured animal the device is continually set ready for use. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. A device of the character described comprising a body formed in its side walls with a plurality of openings, bait holding means located at the center of the body, rock shafts mounted within the body above and below each of the openings and carrying prongs extending toward each other in overlapping relation, spring means urging the lower prongs outwardly, and removable stop members extending through the body and acting to hold the prongs against outward movement.

2. A device of the character described comprising a body formed in its sides with a plurality of openings, bait holding means located at the center of the body, rock shafts journally mounted in the body above and below each of said openings, prongs carried by said rock shafts and extending toward each other in overlapping relation, spring means acting to force the lower prongs outwardly, said prongs being formed with lateral arms, and vertically extending removably mounted pins slidable through the body and arranged in the path of movement of said arms whereby to normally prevent the prongs from swinging outwardly.

In testimony whereof I affix my signature.

WILLIAM A. McINTYRE.